United States Patent [19]

Mori et al.

[11] 3,946,829

[45] Mar. 30, 1976

[54] ULTRASONIC DEVICE

[75] Inventors: Eiji Mori, Tokyo; Kozo Okada; Saburo Ueno, both of Nagoya, all of Japan

[73] Assignee: Nippon Tokushu Togyo Kabushiki Kaisha, Nagoya, Japan

[22] Filed: Oct. 17, 1973

[21] Appl. No.: 407,289

[52] U.S. Cl. .................... 181/142; 310/8.2; 259/2; 259/DIG. 44

[51] Int. Cl.² .................. G01K 10/00; G01K 11/06

[58] Field of Search ........... 310/8.2, 8.1, 9.8; 340/9; 181/.5 R, 142; 259/2, DIG. 44, 4 R

[56] References Cited

UNITED STATES PATENTS

| | | | |
|---|---|---|---|
| 2,578,505 | 12/1951 | Carlin | 310/8.2 |
| 2,725,219 | 11/1955 | Firth | 310/8.2 |
| 2,798,832 | 7/1957 | Harvey | 310/8.2 |
| 3,164,022 | 1/1965 | Ensley | 181/.5 R |
| 3,222,221 | 12/1965 | Branson | 259/DIG. 44 |
| 3,566,313 | 2/1971 | Yuki | 310/8.2 |
| 3,645,504 | 2/1972 | Jacke | 259/2 |
| 3,696,259 | 10/1972 | Mori et al. | 310/8.2 |
| 3,743,523 | 7/1973 | Bodine | 259/DIG. 44 |

FOREIGN PATENTS OR APPLICATIONS

| | | | |
|---|---|---|---|
| 1,113,128 | 5/1968 | United Kingdom | 310/8.2 |

*Primary Examiner*—Maynard R. Wilbur
*Assistant Examiner*—G. E. Montone
*Attorney, Agent, or Firm*—Burns, Doane, Swecker & Mathis

[57] ABSTRACT

An ultrasonic device for convergently radiating ultrasonic energy including a metallic ring vibrated to resonance by at least one electromechanical transducer fixed on the outer circumference of the ring, thereby to deliver high power ultrasonic waves from the inner circumference of the ring into the vacant center thereof.

4 Claims, 3 Drawing Figures

ULTRASONIC DEVICE

BACKGROUND OF THE INVENTION

The present invention relates to a novel device for providing high vibrational energy in the sonic or ultrasonic frequency range, i.e., greater than about 15 KHz. More specifically, the present invention is directed to the provision of an ultrasonic device for providing high intensity ultrasonic waves in the radial direction in response to the application of electric energy.

A conventional ultrasonic device which is capable of delivering ultrasonic waves convergently in the radial direction has heretofore utilized as its ring-like or circular ultrasonic radiator an electromechanical transducing element which is made of piezoelectric or electrostrictive ceramic material such as lead zirconate titanate Pb (Ti—Zr) $O_3$ and has been employed, for example, in continuous ultrasonic mixing or emulsifying liquids as in a pipe or tube. Although the ultrasonic device of this type is known for its intense radiation of ultrasonic waves toward the center or central axis of the ring-like or circular ultrasonic radiator, it has various disadvantages in its manufacturing and in its practical use described as follows.

For one thing, a precise formation of such a ring-like or circular piezoelectric ceramic radiator is difficult in the manufacturing thereof and even more difficult is the formation of electrical insulation on the radially inner circular wall of the radiator without damaging the piezoelectric transducing property of the radiator. And further, even if the inner circular wall of the radiator of piezoelectric ceramic is well electrically insulated, there is a danger that the coated insulating layer will come off in operation due to fluid ultrasonic cavitational vibration or due to the difference of heat expansion between the coating layer and the piezoelectric ceramic radiator, thus rendering the inner wall thereof susceptible to erosion or corrosion. A still further disadvantage of the conventional ultrasonic device is a weakness of the piezoelectric ceramic radiator per se to impacts. A still further drawback is that the conventional ultrasonic device is not capable of producing a desired high power ultrasonic vibrational energy and its use is thus limited to producing a low power ultrasonic field since the size of the ring-like or circular piezoelectric ceramic ultrasonic radiator is limited by the difficulty in manufacturing.

All the above-mentioned disadvantages can be traced in their origin back to the use of a piezoelectric ceramic transducing element per se as a ring-like or circular ultrasonic radiator.

Although there have been requests from various fields of an ultrasonic application engineering such as ultrasonic chemical acceleration, ultrasonic diffusion, ultrasonic suspension, ultrasonic destruction, ultrasonic emulsion, etc., of a highly strenuous ultrasonic device of the kind which is capable of emitting an extremely high powered ultrasonic wave in the radial direction toward the center or central axis, the prior art in referring to the ultrasonic device of the above types refers to "up to 500 watts."

It is accordingly an object of the present invention to provide a novel acoustic device which is capable of radiating extremely high powered acoustic waves convergently in the radial direction.

It is another object of the present invention to provide a novel structural arrangement for an ultrasonic device wherein the ultrasonic radiator can withstand the mechanical impacts, cavitational erosion, corrosion, etc. caused in various applications such as ultrasonic acceleration of chemical reaction, suspension, destruction or diffusion of powders in a liquid, mixing or emulsifying of different liquids, and so forth.

It is a further object of the present invention to provide a novel ultrasonic device for ultrasonically treating vibration-receptive things such as fluids, fine powders and the like in a speedy and continuous manner.

These and many other objects and advantages of the present invention will become apparent from the claims and from the following detailed description when read in conjunction with the appended drawings.

THE DRAWINGS

THE DETAILED DESCRIPTION

Figure 1:
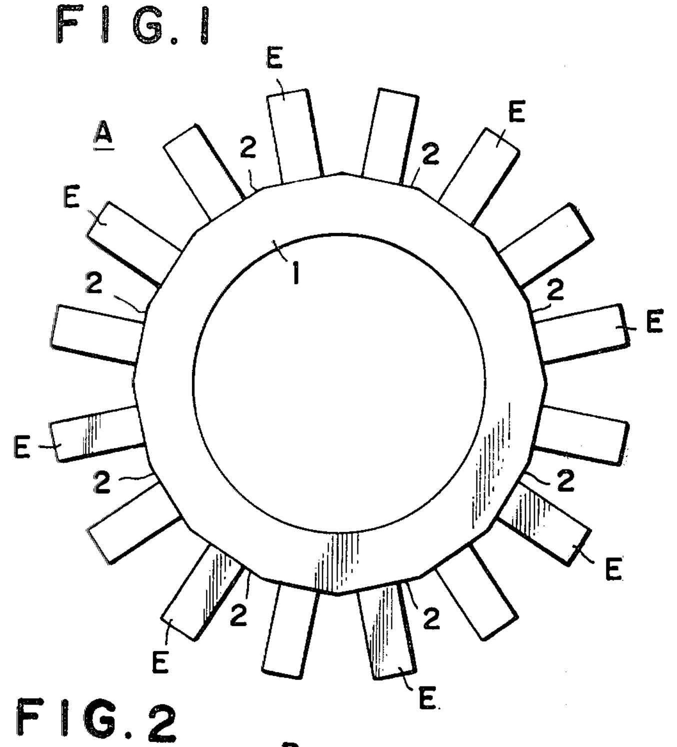
FIG. 1 is an end view in elevation of one embodiment of the ultrasonic device of the present invention.

Referring now to FIG. 1, a metallic ring 1 has a number of faces 2 on its outer polygonal circumference which may be preferably made by forming the outer circumference of a circular steel ring (e.g., 346 mm in outer diameter, 45 mm in width) into a regular 16 sided polygon. On each of the faces 2 may be fixed an electromechanical transducer E such as an electrostrictive or piezoelectric transducer which vibrates at a thickness-vibration-mode frequency in response to a high frequency voltage (e.g., 400 KHz) produced by a voltage frequency oscillator (not shown) which is electrically connected to the transducer. The vibration energy from the electromechanical transducers E are well transmitted to the metallic ring 1 and the ring vibrates resonantly, if the thickness of the ring 1 corresponds to n/2 λ where λ is the wave length and *n*, by way of example, is 7. The ring 1 convergently radiates, from its inner circumference into the circular vacant center, resonant ultrasonic vibrational waves which are highly powered by the resonating effect of the ultrasonic radiator ring 1.

Figure 2:
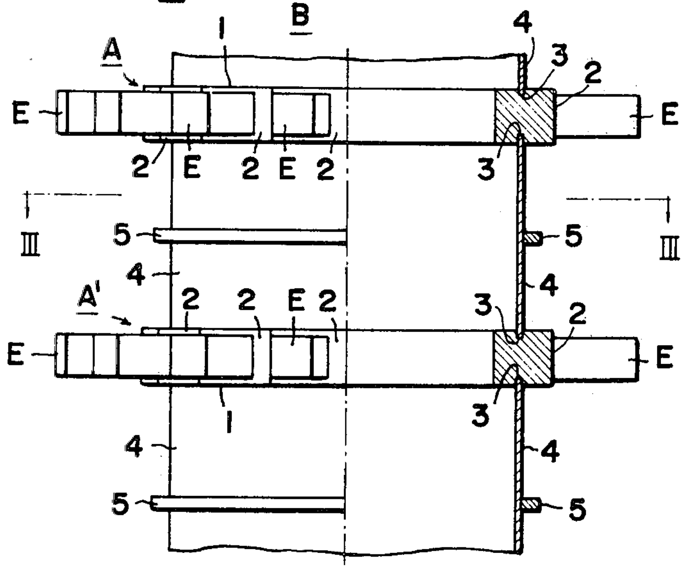
FIG. 2 is a top plan view in partial section of two ultrasonic devices as illustrated in FIG. 1 in place on a tube; and, FIG. 3 is a section in elevation taken along the line III—III of FIG. 2.
Figure 3:
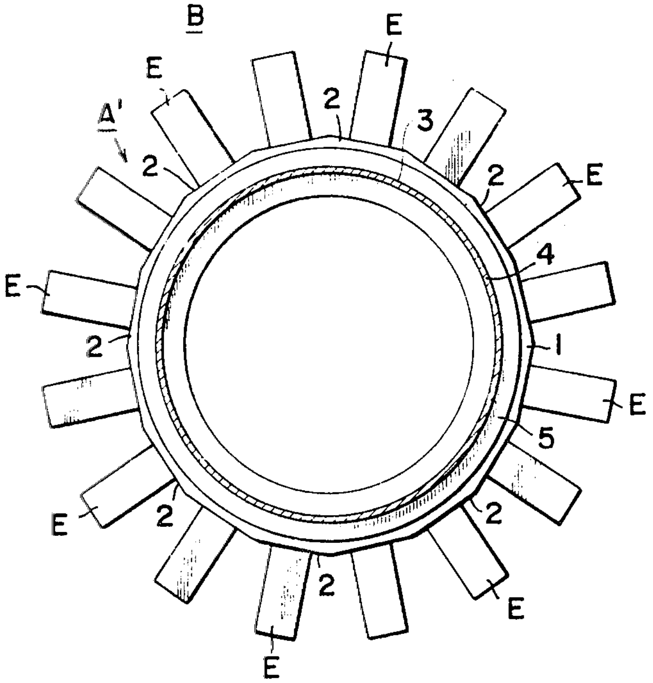

In FIGS. 2 and 3, two ultrasonic devices A are shown in accordance with the present invention in more practical construction connected by a tube 4 in the longitudinal or axial direction thereof. Each edge of tube 4 between the devices A and A' is embedded into a groove 3 cut circularly along the lateral face of the metallic rings 1. The groove 3 must be cut at the nodal point of radial vibration of the ring 1. A flange 5 circularly supports the outer circumference of each section of the tube 4 at the nodal point of longitudinal vibration thereof as modified by the radial vibration of the ring 1 by Poisson's phenomenon.

When ultrasonic vibration receptive things such as suspension liquids, etc. flow through the tube 4 and the rings 1 of the ultrasonic device B shown in FIG. 2, it is apparent for those skilled in the art that the ultrasonic vibration receptive things are subjected for a longer time to stronger cavitation ultrasonic vibration energy, and that the ultrasonic device of this invention is particularly useful in a productive, continuous and speedy ultrasonic treating.

A preferable means for clamping the device B firmly is making each flange 5 large in outer diameter and tightly bolting it to other vibration damping means.

It is to be understood that the ultrasonic vibration receptive things passed through the inner vacant center of the ultrasonic device A or B of the present invention may be passed by various means such as of consisting of pumping system, transporting pipes, flow rate meter, etc.

Although the outer circumference of the ring 1 illustrated above is made a regular polygon, it is desired from the theoretical point of vibration that the outer circumference of the ring is made a regular circle, for the more similar to the regular circle is the outer circumference, the less vibration loss and the higher efficiency of radial ultrasonic vibration energy transmission are attained, but the more difficult is the fixing of the transducers.

Obviously, many modifications and variations of the present invention are possible in the light of the above teachings. It is, therefore, to be understood that within the scope of the appended claims the invention may be practical otherwise than as specifically described.

What is claimed is:

1. An ultrasonic device comprising:
   a plural segment, elongate, hollow tube of generally circular cross section;
   a metallic ring separating adjacent segments of said tube, each of said segments being secured to one of said metallic rings at a nodal point of radial vibration; and,
   a plurality of electromechanical transducers fixed to the radially outer circumference of said metallic ring, each of said plurality of transducers being adapted to be vibrationally energized to deliver ultrasonic waves from the inner circumference of said ring radially inward into the cavity defined by said hollow tube.

2. The ultrasonic device of claim 1 wherein each segment of said tube is provided with a flange on the outer circumference thereof, said flanges being spaced at the nodal points of longitudinal vibration.

3. The ultrasonic device of claim 2 wherein the outer circumference of said ring is a regular polygon; and, wherein each of said transducers is on a fixed face corresponding to one side of said polygon.

4. The ultrasonic device of claim 1 wherein the outer circumference of said ring is a regular polygon; and, wherein each of said transducers is on a fixed face corresponding to one side of said polygon.

* * * * *